United States Patent Office 2,905,652
Patented Sept. 22, 1959

2,905,652
POLYURETHANE RUBBERS

Chris E. Best, Franklin Township, Summit County, Walter R. Hausch, Akron, and James J. Robertson, Franklin Township, Summit County, Ohio, assignors to The Firestone Tire & Rubber Company, Akron, Ohio, a corporation of Ohio No Drawing. Application December 3, 1954
Serial No. 473,024

6 Claims. (Cl. 260—45.4)

This invention relates to the production of diisocyanate-cured polyester elastomers having greatly improved properties, notably in respect to tensile strength, rebound, compression set and internal friction.

The general class of diisocyanate-cured polyester elastomers to which the present invention relates are reaction products of (A) relatively low molecular weight linear polyesters with (B) polyisocyanates. The polyisocyanates react with the labile hydrogen atoms (from the hydroxyl and carboxylic end groups; and ureido and urethan groups formed by prior isocyanate reactions) in the polyester chains to link the relatively low molecular weight polyester chains into longer chains and finally to cross-link these chains to form cured elastomeric structures. The reaction is conveniently carried out in stages, so as to yield first a material resembling unvulcanized natural rubber, so that the material may be processed and fabricated by conventional rubber working techniques, after which the reaction is carried further to the fully cured stage resembling vulcanized rubber.

The degree of polymerization of the polyester before reaction with isocyanates has a fundamental influence on the properties of the final product, since the original polyester chain length determines the minimum spacing between cross-links in the final product. On the basis of a priori considerations, apparently confirmed by experience, it has heretofore been considered that the degree of polymerization of the polyester should be such that its hydroxyl number is from about 40 to about 100.

Contrary to the foregoing theory and practice, the present patentees have found, and the present invention consists in the discovery, that polyesters having hydroxyl numbers of from 10 to 28, and preferably from 18 to 25, yield ultimate cured products which are strikingly superior in almost every significant property to the polyester-diisocyanate products heretofore produced, notably in tensile strength, rebound at low and high temperatures, internal friction and compression set. Moreover, the cured products produced in accordance with this invention require less diisocyanate for preparation of the intermediate millable rubbery products, thus substantially reducing the overall cost of the final cured products.

Referring now more particularly to the polyesters employed in the practice of this invention, these are essentially linear polyesters of dicarboxylic acids with dihydric alcohols. The polymeric chains may, however, include a certain proportion, say up to 10% by weight of the polyester, of residues derived from other bifunctional ester-forming groups such as hydroxy-carboxylic acids. Likewise, they may include very small amounts, say up to 2%, of tri- or higher polyfunctional ester-forming compounds, these proportions being sufficiently small that the essentially linear character of the polyesters is not impaired. The polyesters are produced by heating the monomeric constituents together under the usual esterification conditions, and these conditions are maintained until the hydroxyl number of the polyester has been reduced to between 10 and 28, preferably between 18 and 25. The alcoholic constituents should be supplied in slight stoichiometric excess over the acidic constituents, so that the end groups in the polyester chains will be largely hydroxyl rather than carboxylic acid groups. The amount of acids used, and the vigor and duration of the esterification conditions applied, should be such that the acid number of the polyester does not exceed 2. Polycarboxylic acids adapted for the production of polyesters according to this invention include alkylene and other hydrocarbon-polycarboxylic acids, it being understood that the hydrocarbon radicals may be substituted or interrupted by non-interfering groups such as ether linkages, tertiary amino groups, halogen substituents, keto groups and the like. Suitable dicarboxylic acids are exemplified in malonic, succinic, glutaric, adipic, pimelic, suberic, azelaic, sebacic, brassylic, maleic, malic, fumaric, dilinoleic, diphenic, phthalic, tetrachlorophthalic, isophthalic, terephthalic, hexahydroterephthalic, p-phenylene diacetic, dihydromuconic and beta methyl adipic acids. Suitable tri- and higher polycarboxylic acids (for use, as noted above, in minor proportions of less than 2%, in order to preserve the linear character of the polyesters) include for instance citric, aconitic, itaconic, citraconic and like acids. Polyhydric alcohols which may be used include polyhydroxylated aliphatic, aryl and other hydrocarbons, it being understood that the hydrocarbon radicals may be substituted or interrupted by non-interfering groups such as ether linkages, halogen substituents and the like. Suitable dihydric alcohols are exemplified in ethylene glycol, propylene-1,2-glycol, propylene-1,3-glycol, butylene-1,2-glycol, butane-1,4-diol, decamethylene glycol, dodecamethylene glycol, N,N-diethanolaniline, the monoethyl ether of glycerine, alpha- and beta-allyl ethers of glycerol, thiodiglycol and the like. Suitable tri- and higher polyhydric alcohols (to be used in minor proportions of less than 2%, in order to preserve the linear character of the polyesters) include glycerol, pentaerythritol, sorbitol, diglycerol and the like. The constituents of the esters should be largely aliphatic in character, so as to avoid unduly rigid products; not more than about 15% of the weight of these constituents should be aromatic compounds.

With regard to the reaction of the polyesters with the diisocyanates, broadly speaking this process is carried out in two stages: in the first stage the reaction is controlled so that the reaction is chiefly one of chain extension rather than cross-linking, yielding a product resembling unvulcanized natural rubber, which lends itself to existing rubber-working, compounding and molding apparatus and techniques. In the second stage final cross-linking reaction of the isocyanate with the chain-extended polyester is brought about during the final heating operation corresponding to the vulcanization of natural rubber.

The partial reaction with diisocyanates to yield intermediate products similar to unvulcanized rubber may be controlled to this end in various ways. For instance the polyisocyanates may be supplied in stoichiometric excess over the labile hydrogen in the polyesters, so that the reaction is limited due to blanking off of the end-groups by polyisocyanate. Somewhat the same result may be obtained by using a deficiency of the polyisocyanate. In the case of the polyisocyanate-deficient products, the final curing can be brought about by heating in the presence of further polyisocyanate; in the case of the products containing excess polyisocyanate, the final cure is brought about by compounding with end-group reactivating materials, for example water or polyfunctional amines, alcohols or acids, which will react with the isocyanate end groups to yield new end-groups reactive with further polyisocyanate. The curing reaction may be promoted by the application of elevated temperatures, conveniently in the usual elastomer vulcanization range of 250–300° F. Alternatively, or in conjunction with the application of heat, there may be employed catalysts such as amines on the order of N,N-dimethyl aniline, triethylamine, and the like.

With regard to the polyisocyanates used to bring polyesters up from their original relatively low degree of polymerization to the uncured rubber-like state, these should be largely diisocyanates, as distinguished from tri- and higher polyisocyanates, so as to preserve the generally linear character of the polyester chains. Not more than one or two percent of the polyisocyanates in such operations should be tri- or higher polyfunctional isocyanates. There is no restriction as to the number of isocyanate groups in polyisocyanates employed to effect a final curing, either directly from the non-chain-extended polyesters or from the cured rubber-like chain-extended polyesters. Diisocyanates suitable for use in this invention include for instance p-phenylene diisocyanate, methylene diphenylene diisocyanate, 4,4'-diphenylene methane diisocyanate, dianisidine diisocyanate, 4,4'-tolylidine diisocyanate, 1,5-naphthalene diisocyanate, 4,4'-diphenyl ether diisocyanate, the toluene diisocyanates, hexamethylene diisocyanate, decamethylene diisocyanate, and the like. Suitable triisocyanates for the final curing step are exemplified in 4,4',4''-triisocyanato triphenyl methane, 1,3,5-triisocyanato benzene, 2,4,6-triisocyanato toluene, and the like.

With respect to the amounts of isocyanates to be employed in accordance with this invention, these are substantially less than the amounts required with polyesters having hydroxyl numbers in the relatively higher conventional ranges of 40–100, both types of compositions being compounded for the optimum of any given set of properties designed for any particular end use. For example, typical rubbers based on polyesters having hydroxyl numbers of 50–80 will require about 12–20% of diisocyanate in the chain-extension step, and 9–13% of diisocyanate in the curing step, or a total of 21–33%, to yield a good all-around vulcanized product (the percentages being on the basis of the weight of the polyester). The corresponding figures for the products of the present invention, starting with polyesters having hydroxyl numbers of 10–28, are 6–10% diisocyanate for the chain-extension step, and 8–10% diisocyanate for the curing step, or a total of 14–20% overall. This represents a very substantial savings in the materials cost, since the diisocyanates are necessarily the most expensive starting materials. Moreover, the final cured products obtained in accordance with this invention have distinctly superior properties as compared to conventional vulcanizates based on high hydroxyl number polyesters in all respects which are commonly considered important, and particularly in respect to tensile strength, modulus of elasticity, elongation, rebound, compression set, and internal friction.

With the foregoing general discussion in mind, there are given herewith detailed examples of the practice of this invention. All parts given are by weight.

EXAMPLE I (A) Preparation of polyester: Pounds
Adipic acid _____ 79.5
Ethylene glycol _____ 29.12
Propylene glycol _____ 15.875

A 20-gallon stainless steel reactor fitted with a steam-jacketed reflux condenser, a water-cooled take-off condenser above the reflux condenser and a circulating oil heating jacket were provided for the reaction. The above reactants were charged into the reactor, steam was introduced into the reflux condenser jacket to ensure passage of evolved water through the reflux condenser, and cold water was introduced into the take-off condenser jacket to condense the distillate passing the reflux condenser. The temperature of the charge was brought up to 164° C. over a period of 6 hours, the cumulative distillate recovered from the take-off condenser amounting to 5820 cc. at the end of this time. These reaction conditions were continued for a further 19 hours, the temperature being increased to 205° C., at the end of which time a total of 9574 cc. of distillate, largely aqueous, had been recovered.

Vacuum was then applied to reduce the absolute pressure in the system to 23 mm. of mercury, and a stream of nitrogen gas was bubbled through the mass. After a momentary drop, the temperature rose to 205–208° C., these conditions being maintained for 13 hours, at the end of which time a total of 2630 cc. of glycol had been recovered from the take-off condenser. The reaction mass was then discharged and cooled. The polyester product was dark-colored and had a hydroxyl number of 22.7 and an acid number of 0.3.

(B) Chain extension: Parts
Polyester (prepared as just described)_____ 2700
Hexamethylene diamine _____ 16.2
Methylene diphenylene diisocyanate _____ 183.6

The polyester and hexamethylene diamine were heated together at 140–150° C. for 30 minutes and cooled to 120° C. The methylene diphenylene diisocyanate was then mixed in, and the mass baked at 130° C. for 18 hours. The product was then cooled, and given 9 passes through a mill. The milled product was rubbery and had a Mooney viscosity ML-4(212°) of 76.5.

(C) Compounding and curing: Parts
Chain-extended polyester (prepared as just described) _____ 300
Magnesium stearate _____ 6
Methylene diphenylene diisocyanate _____ 27

The above materials were milled together at 130–150° F., allowed to rest for 4 hours, remilled briefly, sheeted out, and cured in molds at 280° F. for 60 minutes. The resultant products had excellent rubbery properties, particularly with respect to rebound, internal friction, modulus, tensile strength and compression set, which properties are set out in Table I.

For control purposes, there were prepared cured rubbers from polyesters prepared similarly as described above, except that the hydroxyl numbers of the polyesters were kept in the conventional higher ranges of 40–100, and different amounts of diisocyanate (determined by experience to be the optimum for these polyesters) were used in the chain-extension and final compounding steps. The properties of these products are set forth in Table I below, and the superiority of the product of this invention (item No. 1) to these other products is quite evident.

All specimens were aged for one week before testing.

Table 1

| Item No. | 1 | 2 | 3 |
|---|---|---|---|
| Hydroxyl number of polyester | 22.7 | 53 | 79 |
| Percent of diisocyanate used in chain-extending polyester, based on weight of polyester | 6.8 | 13.7 | 18.9 |
| Percent of diisocyanate used in curing, based on weight of chain-extended polyester | 9.0 | 10.0 | 7.0 |
| 400% modulus, p.s.i. | 850 | 600 | 850 |
| Tensile strength, p.s.i. | 5,725 | 4,800 | 3,550 |
| Elongation, percent | 740 | 740 | 600 |
| Shore hardness | 55 | 50 | 58 |
| Rebound, percent at— | | | |
| 73° F. | 61 | 46 | 30 |
| 212° F. | 84 | 78 | 68 |
| Compression set "B," percent | 2.56 | 6.89 | 4.92 |
| Dynamic modulus, p.s.i. at— | | | |
| 50° C. | 170 | 177 | 223 |
| 100° C. | 168 | 165 | 172 |
| Internal friction, K poises at— | | | |
| 50° C. | 1.95 | 2.85 | 4.96 |
| 100° C. | 1.58 | 2.40 | 3.27 |
| Static modulus, p.s.i. at— | | | |
| 50° C. | 120 | 97 | 102 |
| 100° C. | 139 | 115 | 102 |

EXAMPLE II

| | Parts |
|---|---|
| Chain-extended polyester (prepared as described at B in Example I) | 300. |
| Magnesium stearate | 6. |
| Tolylidine diisocyanate | 25.2–31.8 (8.4–10.6% per Table II). |

A series of compositions in accordance with the foregoing schedule was milled together and cured as described in Example I. Likewise, control samples were prepared and cured, starting from polyesters having conventionally higher hydroxyl numbers and using the same compounding ingredients, except that the diisocyanate was adjusted to give optimum properties. Cured samples were aged, some (a) for one week at room temperature and others (b) for four days at 212° F. Properties of the products are tabulated herewith, and the superiority of the products of this invention (items Nos. 1–3) over conventional products (items Nos. 4 and 5) is very evident.

Table II

| Item No. | 1 | 2 | 3 | 4 | 5 |
|---|---|---|---|---|---|
| Hydroxyl number of polyester | 22.7 | 22.7 | 22.7 | 53 | 79 |
| Parts methylene diphenyl diisocyanate per 100 parts of polyesters used in chain-extending the polyester | 6.8 | 6.8 | 6.8 | 13.7 | 18.9 |
| Parts bitolylene diisocyanate per 100 parts of chain-extended polyesters to cure rubber | 8.4 | 9.5 | 10.6 | 10.5 | 9.5 |

PROPERTIES AFTER AGING 1 WEEK AT 25° C.

| | 1 | 2 | 3 | 4 | 5 |
|---|---|---|---|---|---|
| 400% modulus, p.s.i. | 1,150 | 1,200 | 1,575 | 1,450 | 575 |
| Tensile strength, p.s.i. | 5,800 | 5,600 | 5,150 | 5,175 | 2,625 |
| Elongation, percent | 660 | 640 | 580 | 570 | 830 |
| Shore hardness | 70 | 70 | 70 | 72 | 66 |
| Rebound, percent at— | | | | | |
| 73° F. | 61 | 57 | 52 | 42 | 37 |
| 212° F. | 67 | 63 | 61 | 58 | 57 |
| Compression Set, "B," percent | 7.1 | 7.2 | 7.6 | 8.4 | 14.3 |
| Dynamic modulus, p.s.i. at— | | | | | |
| 50° C. | 359 | 347 | 364 | 388 | 341 |
| 100° C. | 324 | 317 | 317 | 324 | 267 |
| Internal friction, K poises at— | | | | | |
| 500° C. | 4.20 | 4.42 | 4.47 | 5.95 | 5.95 |
| 100° C. | 3.94 | 3.31 | 3.43 | 4.42 | 5.41 |
| Static modulus, p.s.i. at— | | | | | |
| 500° C. | 244 | 244 | 279 | 244 | 139 |
| 100° C. | 244 | 244 | 244 | 217 | 122 |

PROPERTIES AFTER AGING AT 212° F. FOR 4 DAYS

| | 1 | 2 | 3 | 4 | 5 |
|---|---|---|---|---|---|
| 400% modulus, p.s.i. | 1,125 | 1,200 | | 1,275 | 600 |
| Tensile strength, p.s.i. | 6,360 | 5,970 | | 5,200 | 2,380 |
| Elongation, percent | 710 | 700 | | 620 | 860 |

What is claimed is:

1. Process which comprises heating (I) a substantially linear polyester the monomeric constituents of which consist of (a) a dicarboxylic acid with (b) a substance selected from the group consisting of dihydric alcohols and mixtures of dihydric alcohols with up to 10%, based on the weight of the polyester, of hydroxy-carboxylic acids, and up to 2%, based on the weight of polyester, of polycarboxylic acids and polyhydric alcohols having a functionality greater than 2, said linear polyester having a hydroxyl number of from 18 to 25 and an acid number less than 2, with (II) 6–10% of an organic diisocyanate sufficient to chain-extend the polyester to produce an intermediate product (III) resembling unvulcanized natural rubber, and heating the intermediate product (III) with (IV) a further 8–10% of an organic polyisocyanate to produce a cured, elastic, rubbery product.

2. Process which comprises heating (I) a linear polyester the monomeric constituents of which consist of (a) adipic acid, (b) ethylene glycol and (c) propylene glycol having a hydroxyl number of 22.7 and an acid number 0.3, with (II–a) a hexamethylene diamine and with (II–b) 6.8%, based on the weight of polyester, of methylene diphenylene diisocyanate to yield an intermediate chain-extended product (III) resembling unvulcanized natural rubber, and heating the intermediate product (III) with (IV) a further 9.0%, based on the weight of chain-extended polyester, of methylene diphenylene diisocyanate to produce a cured, elastic, rubbery product.

3. Process which comprises heating (I) a linear polyester the monomeric constituents of which consist of (a) adipic acid, (b) ethylene glycol and (c) propylene glycol having a hydroxyl number of 22.7 and an acid number 0.3, with (II–a) hexamethylene diamine and with (II–b) 6.8%, based on the weight of polyester, of methylene diphenylene diisocyanate to yield an intermediate chain-extended product (III) resembling unvulcanized natural rubber, and heating the intermediate product (III) with (IV) 8.4%, based on the weight of chain-extended polyester, of bitolylene diisocyanate to produce a cured, elastic, rubbery product.

4. A vulcanized, rubbery elastomeric product characterized by excellent properties with respect to tensile strength, rebound, compression set and internal friction, produced by heating (I) a substantially linear polyester the monomeric constituents of which consist of (a) a dicarboxylic acid with (b) a substance selected from the group consisting of dihydric alcohols and mixtures of dihydric alcohols with up to 10%, based on the weight of the polyester, of hydroxycarboxylic acids, and up to 2%, based on the weight of polyester, of polycarboxylic acids and polyhydric alcohols having a functionality greater than 2, said linear polyester having a hydroxyl number of from 18 to 25 and an acid number less than 2, with (II) 6–10% of an organic diisocyanate sufficient to chain-extend the polyester to produce an intermediate product (III) resembling unvulcanized natural rubber, and heating the intermediate product (III) with (IV) a further 8–10% of an organic polyisocyanate to produce a cured, elastic, rubbery product.

5. A vulcanized, rubbery elastomeric product characterized by excellent properties with respect to tensile strength, rebound, compression set and internal friction, produced by heating (I) a linear polyester the monomeric constituents of which consist of (a) adipic acid, (b) ethylene glycol and (c) propylene glycol having a hydroxyl number of 22.7 and an acid number 0.3, with (II–a) hexamethylene diamine and with (II–b) 6.8%, based on the weight of polyester, of methylene diphenylene diisocyanate to yield an intermediate chain-extended product (III) resembling unvulcanized natural rubber, and heating the intermediate product (III) with (IV) a further 9.0%, based on the weight of chain-extended polyester, of methylene diphenylene diisocyanate to produce a cured, elastic, rubbery product.

6. A vulcanized, rubbery elastomeric product characterized by excellent properties with respect to tensile strength, rebound, compression set and internal friction, produced by heating (I) a linear polyester the monomeric constituents of which consist of (a) adipic acid, (b) ethylene glycol and (c) propylene glycol having a hydroxyl number of 22.7 and an acid number 0.3, with (II–a) hexamethylene diamine and with (II–b) 6.8%, based on the weight of polyester, of methylene diphenylene diisocyanate to yield an intermediate product (III) resembling unvulcanized natural rubber, and heating the intermediate product (III) with (IV) 8.4%, based on the weight of chain-extended polyester, of bitolylene diisocyanate to produce a cured, elastic, rubbery product.

(References on following page)

References Cited in the file of this patent

UNITED STATES PATENTS

| | | |
|---|---|---|
| 2,621,166 | Schmidt et al. | Dec. 9, 1952 |
| 2,625,531 | Seeger | Jan. 13, 1953 |
| 2,650,212 | Windemuth | Aug. 25, 1953 |
| 2,729,618 | Muller et al. | Jan. 3, 1956 |
| 2,730,518 | Birley et al. | Jan. 10, 1956 |

FOREIGN PATENTS

| | | |
|---|---|---|
| 878,827 | Germany | June 8, 1953 |

OTHER REFERENCES

Bayer et al.: Rubber Chem. and Techn., October-December 1950, pages 812–835.